US005366784A

United States Patent [19]

Herbison

[11] Patent Number: 5,366,784

[45] Date of Patent: Nov. 22, 1994

[54] CORROSION INHIBITING OFFSET PRINTING BLANKET

[76] Inventor: Paul R. Herbison, 27 Pine Loop, Cedar Crest, N. Mex. 87008

[21] Appl. No.: 13,090

[22] Filed: Feb. 3, 1993

Related U.S. Application Data

[63] Continuation of Ser. No. 660,958, Feb. 26, 1991, abandoned.

[51] Int. Cl.[5] .......... B32B 5/16; B41F 30/00

[52] U.S. Cl. .......... 428/141; 428/143; 428/148; 428/344; 428/256; 428/263; 428/457; 428/909; 101/485; 101/415.1; 101/217; 101/177; 101/382.1

[58] Field of Search .......... 428/143, 148, 344, 256, 428/263, 457, 909; 101/485, 415.1, 217, 177, 382.1

[56] References Cited

U.S. PATENT DOCUMENTS

| | | | |
|---|---|---|---|
| 1,210,375 | 12/1916 | Decker | 428/909 |
| 3,235,772 | 2/1966 | Gurin | 428/909 |
| 3,623,965 | 11/1971 | Owren | 101/157 |
| 3,865,595 | 2/1975 | Watkinson | 430/166 |
| 4,052,217 | 10/1977 | Watkinson | 430/166 |
| 4,119,035 | 10/1978 | Reiser et al. | 101/459 |
| 4,219,595 | 8/1980 | Spöning | 428/909 |
| 4,350,735 | 9/1982 | Saitoh | 428/148 |
| 4,557,966 | 12/1985 | Weil | 428/209 |
| 4,687,698 | 8/1987 | Weil et al. | 428/209 |
| 4,766,811 | 8/1988 | Linska | 101/415.1 |
| 4,798,627 | 1/1989 | Schmitt et al. | 106/2 |
| 4,817,527 | 4/1989 | Wouch et al. | 101/415.1 |
| 5,006,400 | 4/1991 | Pinkston et al. | 428/409 |
| 5,072,670 | 12/1991 | Bergmann et al. | 101/DIG. 36 |
| 5,096,487 | 3/1992 | Schell | 106/2 |

*Primary Examiner*—William P. Watkins, III
*Attorney, Agent, or Firm*—Hoffman, Wasson & Gitler

[57] ABSTRACT

Method of inhibiting corrosion of blanket cylinders used in offset printing operations, in which zinc is applied to the surfaces of printing blankets which contact the blanket cylinders, by application of zinc powder to an adhesive layer, or by impregnating zinc particles into the surface of the printing blanket, or by weaving zinc threads into the material of the printing blanket, or by attaching zinc foil to the printing blanket; together with printing blankets so prepared. The zinc acts to inhibit electrochemical corrosion and rusting of the blanket cylinder steel, by virtue of the fact that zinc is a sacrificial metal which is more chemically active than the iron in the steel, and is therefore oxidized in lieu of the iron.

43 Claims, No Drawings

CORROSION INHIBITING OFFSET PRINTING BLANKET

This is a continuation of copending application(s) Ser. No. 07/660,958 filed on Feb. 26, 1991 abandoned.

BACKGROUND OF THE INVENTION

The present invention pertains to offset printing blankets used in offset printing operations, and more particularly to a method of treating said blankets so as to greatly retard or eliminate the rusting of offset printing blanket cylinders, caused by repeated exposure of the cylinders to the water which is used in conventional offset printing operations.

In a conventional offset printing operation, printing plates carrying photographic exposures showing the images to be printed, in correct form, are mounted upon plate cylinders. Offset printing blankets, mounted on separate blanket cylinders, are used as an image transfer means. During the printing operation the printing blankets, attached to rotating blanket cylinders, each roll against a plate cylinder, picking up reversed images from the printing plate or plates. These reversed images are then transferred to paper with a second reversal, resulting in correct final images, when the paper is passed between two blanket cylinders, when printing on both sides of the page, or between a blanket cylinder and another cylinder when printing on one side only, which presses the paper against the blanket.

Water is applied to the printing plates in the conventional offset printing operation, because the water tends to keep the printing ink from sticking to non-exposed areas of the printing plates. The presence of water in the press obviously presents a potential for corrosion of steel parts of the press, such as the plate cylinders and blanket cylinders. Although the cylinders are nickel coated, and underlying steel becomes exposed through wear, corrosion or rust and the physical damage caused by passing a foreign object between the press cylinders during press operation. The nickel coating is also seen to abrade away by the movement of the blanket at the unabutted edge of each blanket. Each blanket may have an unabutted edge, since there are sometimes two blankets per blanket cylinder, each covering the full circumference and half the cylinder width. Therefore, during printing operations using both blanket sections on the blanket cylinder, there is greater movement at the free edges of the blankets, at the cylinder edges, than at the center of the cylinder where the two blankets meet. This movement varies from blanket to blanket due to the human factor, since each blanket is hand fastened by a pressman.

The printing plate are ordinarily removed from the plate cylinders after each press run, at least where new material is to be printed in the next run, i.e. daily in the case of a newspaper, allowing cleaning and drying of the plate cylinder surfaces between press runs. Since the plate cylinders are thus accessible for cleaning between press runs, corrosion of the plate cylinders from exposure to the water has ordinarily not been a serious problem.

However, the situation is different as to the blanket cylinders. The printing blankets are only changed when damaged or worn out of tolerance, since it is possible, by washing them down with a solvent, to remove any residual ink remaining after completion of the press run; the residual ink may be minimal in any case, assuming that the inking has been adjusted for the number of pages to be produced in the press run. Since the printing blankets typically remain on the blanket cylinders for an extended period of time, and since the printing blankets roll against the printing plates, they are also exposed to the water, and the water tends to seep under the edges of the printing blankets, onto the blanket cylinders, particularly near the edges of the blanket. Therefore a serious corrosion problem has resulted for nickel plates or other metal plated steel blanket cylinders used in offset printing operations. Marked corrosion of the blanket cylinders is often observed after significant use. This corrosion tends to be concentrated near the edges of the blankets, indicating that it is caused by electrochemical action promoted by the water seeping under the edges of the printing blankets, and/or by mechanical damage, from removal of nickel plating due to contact with foreign material in printing operations. Although some blanket cylinders have been made from stainless steel in recent years, in an effort to deal with this problem, these are much more expensive than ordinary steel cylinders, and have not been found to be fully satisfactory in eliminating such corrosion.

The approach of applicant's invention is simple, and much less expensive one, based on the concept of adding a sacrificial metal, more chemically active than the iron contained in the steel of the blanket cylinders, to the surfaces of the printing blankets which are in contact with the surfaces of the blanket cylinders. Such a sacrificial metal can take the place of the iron atoms in electrochemical actions induced by the water. Of the various possible sacrificial metals which might be used for this purpose, applicant selected zinc as the only one which was practicable under actual working conditions. Thus the zinc additive of the printing blankets corrodes, in lieu of the steel of the blanket cylinders. Since the printing blankets are replaced after a flew months use anyway, this presents no practical disadvantage for the printing operation. Moreover, zinc is quite inexpensive, allowing a significant cost saving as compared with the use of stainless steel blanket cylinders, which have in any case not been fully effective.

SUMMARY OF THE INVENTION

Applicant's invention involves the use of zinc in an offset printing blanket as a means of preventing corrosion of offset printing blanket cylinders, caused by exposure of the steel of the blanket cylinders to water used in the offset printing process. The zinc is applied to the surface of the offset printing blanket which contacts the blanket cylinder surface. The zinc may be applied by first coating the surface of the offset printing blanket with a suitable adhesive, and then applying zinc dust to the adhesive layer. Alternatively, zinc may be impregnated into the surface of the offset printing blanket during manufacture, or woven, in the form of zinc thread, into the surface of the offset printing blanket. Applicant's invention depends simply upon the fact that zinc, being a sacrificial metal which is more chemically active than the iron contained in the steel of blanket cylinders, preferentially is oxidized, in lieu of the iron of the printing cylinder steel, upon exposure of the offset printing blanket and cylinder to the water used in offset printing operations.

DESCRIPTION OF THE PREFERRED EMBODIMENTS

The efficacy of the invention has been demonstrated in two experiments, in which zinc dust was applied to an adhesive layer first applied to the surface of the printing blanket which was to come into contact with the blanket cylinder during offset printing operations:

EXAMPLE I

In a newspaper offset printing plant, at the San Diego Union-Tribune, in San Diego, Calif., the printing blanket was removed from a blanket cylinder after normal use, revealing a one inch wide band of rust all around the edge of the blanket cylinder. The printing press unit involved in the test was unit 33, D Press, a Goss Metro Press #3160, having a regular 10-side nickel coated steel blanket cylinder. Using a belt sander, applicant ground out all traces of rust in the affected area of the blanket cylinder, to create a new, bare steel environment in which rust could occur during the experiment. Selecting a Grace brand printing blanket, which way a generic PCMP regular with bars, measuring 47 5/16 by 28½ by 0.083 inches, applicant selected three areas to be treated with zinc dust, all located at the edge of the printing blanket, which would in operation of the press be in contact with the edge portion of the blanket cylinder, where the rust band had been observed and removed. The three areas to be treated with zinc dust were intentionally spaced apart, separated by two edge areas which were to be untreated.

The three areas to be treated were physically defined by taping them off from the rest of the printing blanket by using masking tape. The treatment areas were then coated with a light coating of 3M brand #77 spray adhesive, to give a sticky base for application of the zinc dust. It was observed that the spray adhesive did not produce an even coating. The coating used was light enough to remain tacky to the touch.

After about one minute from the time of spraying with the spray adhesive, when no adhesive was removed by light touching, applicant then applied zinc dust, specified to be of one to five micron size by supplier Atlantic Equipment Engineers, to the adhesive layers of the spray adhesive in the three treatment areas, using a small brush. This method of applicant worked well, and was continued until zinc dust had been applied to cover all of the spray adhesive, although the middle treated area received a lighter coat of zinc powder than the other two treated areas. Applicant estimates that the average amount of zinc used was 0.12 grams per square inch.

The printing blanket was then reinstalled on the blanket cylinder, with the test edge of the printing blanket (the edge containing the three areas treated with zinc dust, and the two intervening untreated areas) directly over the freshly ground steel area of the blanket cylinder.

This blanket cylinder was then used in normal newspaper printing operations, for a period of thirty eight days. After twenty days of printing operations, the printing blanket was removed for observation of results. The two outer treated areas showed no rust, while the middle treated area (which had received a lighter coating of zinc than the other two treated areas) showed some rust pits at the borders with the intervening untreated areas. The intervening untreated areas showed a coating of rust pitting, but not to the degree that applicant had expected, based upon five years experience of observations during pre-plating cylinder surface preparation. In that five year period, frequently due to variations in printing schedules or in the amount of work he was able to accomplish in such preparations in the allotted time, applicant had sometimes been required to interrupt surface preparation, after having a portion of the cylinder surface to a clean steel condition verified with a 60× magnifier. Upon returning after a week or more in which the cylinder had been used in printing operations, applicant generally had observed that the previously clean area would be covered with either light rust or corrosion, removable by hand sanding, or by pitting, requiring re-grinding with an electric grinder.

After twenty two days of use in printing operations, the treated printing blanket had to be removed, due to physical damage which had occurred in the center of the print area. At that time a new, untreated printing blanket was installed on the same blanket cylinder.

After thirty eight days of printing operations (measured from the time that the treated printing blanket had been installed on the same blanket cylinder), this being fourteen days after removal of the treated printing blanket, the second (untreated) printing blanket was removed from the blanket cylinder, for observation purposes. The entire cylinder edge area, including the areas which had been in contact with both the treated and untreated areas of the treated printing blanket used in the first twenty two days of the test, was covered in rust. It was observed that the two edge areas which had been in contact with the untreated edge areas of the printing blanket bore somewhat more rust, than the areas which had been in contact with the treated areas of the treated printing blanket, apparently by the added amount they had rusted during the period that the treated printing blanket had been in use. The presence of zinc had retarded rust advancement over the entire area covered by the blanket, compared to the rusting noted on other areas of the same cylinder.

EXAMPLE II

A wholly separate test of the invention was conducted at the same newspaper. The printing press unit involved in the test was unit 16, B Press, a Goss Metro Press #3129. This test used a 10-side blanket cylinder at the operator end. This particular blanket cylinder used in this test is made of 400 series stainless steel. In spite of being made of stainless steel, this blanket cylinder was observed to have corrosion pits in the edge area where water had previously seeped under the printing blanket, upon removal of the printing blanket prior to commencement of the test. After the initial removal of the printing blanket, the corrosion pits were lightly sanded with 220 grit paper to remove any loose rust.

A strip about 2.5 inches wide around the entire edge of the printing blanket was selected for treatment with zinc in this test. The printing blanket used was a new Grace brand blanket of the same specifications as that used in Example I. This treatment area was coated with 3M brand Fethering Disk Adhesive, with which a more even coating was obtained than had been obtained in the first test with the 3M #77 adhesive. Zinc powder, of the same particle size range used in Example I, was then applied to the adhesive layer on the treatment area in the same manner as in the first test, with approximately the same areal density of 0.12 grams per square inch.

The treated printing blanket was then installed on the blanket cylinder, and normal printing operations were conducted over a period of thirty nine days.

Upon removal of the printing blanket from the blanket cylinder at the end of this period, no rust was found anywhere on the blanket cylinder where rusting had occurred before. The absence of rust was also indicated by absence of color in the pits and absence of rust staining on the blanket. Due to either the type of adhesive or the quantity of adhesive used, the printing blanket had adhered to the blanket cylinder more than was desirable.

Those familiar with the art will appreciate that the present invention may be employed in configurations other than the specific configurations disclosed herein, without departing from the essential substance of the invention.

For example, instead of being applied to the surface of the printing blanket by means of sprinkling zinc powder on an adhesive layer, zinc particles could instead be impregnated into the material of the printing blanket, including the surface layer thereof, during or after manufacture by any number of conventional, convenient methods, such as, for example, using medium to high pressure air to blow zinc powder into the weave of the blanket backing.

Or zinc threads could be woven into the material of the printing blanket, including the surface layer thereof, during manufacture of the printing blanket.

Or zinc foil could be attached to the surface of the printing blanket by means of a suitable adhesive.

Since applicant's invention depends merely upon the availability of zinc in close proximity to the iron of the blanket cylinder steel, there is no reason to expect that it should matter, for example, whether the zinc is in the form of a powder or a thread, on the surface of the printing blanket.

The essential characteristics of the invention are defined by the following claims.

I claim:

1. In a printing apparatus including a metal blanket cylinder susceptible to corrosion during normal printing operations, and a printing blanket having an exposed printing surface and a cylinder-contacting surface mounted on the cylinder, the improvement comprising a mounted printing blanket consisting essentially of a printing blanket material and a sacrificial metal for the metal of the cylinder disposed within or on the cylinder-contacting surface of the mounted blanket in substantial electrochemical contact with the surface of the cylinder in an amount and disposition sufficient to inhibit corrosion of the blanket cylinder, but not also upon the exposed printing surface during printing of the blanket in an amount which substantially covers said printing surface.

2. The printing apparatus of claim 1, wherein the metal of the blanket cylinder is steel, or stainless steel, or steel coated with a corrosion-resistant coating subject to wear.

3. The printing apparatus of claim 2, wherein the metal of the blanket cylinder is nickel-coated steel.

4. The printing apparatus of claim 2, wherein the metal of the blanket cylinder is steel or stainless steel.

5. The printing apparatus of claim 2, wherein the sacrificial metal is zinc.

6. The printing apparatus of claim 2, wherein the sacrificial metal comprises a thin layer of zinc particles adhered on at least a portion of the cylinder-contacting surface of the blanket material.

7. The printing apparatus of claim 6, wherein the zinc particles have a diameter of from about 1 to 5$\mu$.

8. The printing apparatus of claim 2, wherein the sacrificial metal comprises a thin layer of zinc foil or particles adhered to at least a portion of the cylinder-contacting surface of the blanket material.

9. The printing apparatus of claim 8, wherein the foil or particles are adhered to substantially less than the entire surface of the blanket material.

10. The printing apparatus of claim 2, wherein the sacrificial metal comprises zinc particles impregnated within at least a portion of the cylinder-contacting surface of the printing blanket material.

11. The printing apparatus of claim 10, wherein the zinc particles have a diameter of from about 1 to 5$\mu$.

12. The printing apparatus of claim 10, wherein the zinc particles are impregnated within substantially the entire cylinder-contacting surface of the blanket material.

13. The printing apparatus of claim 10, wherein the zinc particles are impregnated within substantially less than the entire cylinder-contacting surface of the blanket material.

14. The printing apparatus of claim 12, wherein the zinc particles have a diameter of from about 1 to 5$\mu$.

15. The printing apparatus of claim 2, wherein the sacrificial metal comprises zinc strands interwoven into the cylinder-contacting surface of the blanket material.

16. The printing apparatus of claim 1, wherein the printing apparatus is an offset printing apparatus and the corrosion is caused by ambient water used in offset printing.

17. A printing blanket for mounting on a metal blanket cylinder of a printing apparatus; said printing blanket consisting essentially of a printing blanket material having a printing surface and a cylinder-contacting surface containing a sacrificial metal for the metal of the blanket cylinder disposed on or within the cylinder-contacting surface of the blanket material for substantial electrochemical contact with the blanket cylinder in an amount and disposition sufficient to inhibit corrosion of the metal of the blanket cylinder during printing, but not also upon the printing surface of the blanket in an amount which substantially covers said printing surface during printing; and said metal cylinder consisting essentially of steel, stainless steel, or steel coated with a corrosion-resistant coating subject to wear.

18. The printing blanket of claim 17, wherein the sacrificial metal is zinc.

19. The printing blanket of claim 18, wherein the zinc is impregnated within the cylinder-contacting surface of the blanket material in the form of particles.

20. The printing blanket of claim 19, wherein the zinc particles have a diameter of from about 1 to 5$\mu$.

21. The printing blanket of claim 18, wherein the zinc is adhered to the cylinder-contacting surface of the blanket material.

22. The printing blanket of claim 21, wherein the zinc is adhered in the form of a foil.

23. The printing blanket of claim 18, wherein the zinc comprises a thin layer of zinc particles directly applied to at least a portion of the cylinder-contacting surface of the blanket material.

24. The printing blanket of claim 23, wherein the zinc particles have a diameter of from about 1 to 5$\mu$.

25. The printing blanket of claim 18, wherein the zinc is woven into the cylinder-contacting surface of the blanket material.

26. The printing blanket of claim 19, wherein the zinc is impregnated in substantially less than the entire cylinder-contacting surface of the blanket material.

27. The printing blanket of claim 21, wherein the zinc is adhered to substantially less than the entire cylinder-contacting surface of the blanket material.

28. A method for inhibiting corrosion in a printing apparatus including a metal blanket cylinder susceptible to corrosion during normal printing operations and a printing blanket having an exposed printing surface and a cylinder-contacting surface mounted on the cylinder, comprising mounting a printing blanket consisting essentially of a printing blanket material and a sacrificial metal for the metal of the cylinder disposed within or on the cylinder-contacting surface of the blanket in substantial electrochemical contact with the surface of the cylinder in an amount and disposition sufficient to inhibit corrosion of the blanket cylinder but not also upon the exposed printing surface of the blanket in an amount which substantially covers said printing surface during printing; and printing with the blanketed cylinder.

29. The method of claim 28, wherein the metal of the blanket cylinder is steel, stainless steel, or steel coated with a corrosion-resistant coating subject to wear.

30. The method of claim 29, wherein the metal of the blanket cylinder is nickel-coated steel.

31. The method of claim 29, wherein the metal of the blanket cylinder is steel or stainless steel.

32. The method of claim 29, wherein the sacrificial metal is zinc.

33. The method of claim 29, wherein the sacrificial metal comprises a thin layer of zinc particles directly applied to at least a portion of the cylinder-contacting surface of the blanket material.

34. The method of claim 33, wherein the zinc particles have a diameter of from about 1 to 5μ.

35. The method of claim 29, wherein the sacrificial metal comprises a thin layer of zinc foil adhered to at least a portion of the cylinder-contacting surface of the blanket material.

36. The method of claim 35, wherein the foil is adhered to substantially less than the entire surface of the blanket material.

37. The method of claim 29, wherein the sacrificial metal comprises zinc particles impregnated within at least a portion of the cylinder-contacting surface of the printing blanket material.

38. The method of claim 37, wherein the zinc particles have a diameter of from about 1 to 5μ.

39. The method of claim 37, wherein the zinc particles are impregnated within substantially the entire cylinder-contacting surface of the blanket material.

40. The method of claim 37, wherein the zinc particles are impregnated within substantially less than the entire cylinder-contacting surface of the blanket material.

41. The method of claim 39, wherein the zinc particles have a diameter of from about 1 to 5μ.

42. The method of claim 29, wherein the sacrificial metal comprises zinc strands interwoven into the cylinder-contacting surface of the blanket material.

43. The method of claim 28, wherein the printing apparatus is an offset printing apparatus and the corrosion is caused by ambient water used in offset printing.

* * * * *